US012462792B2

United States Patent
Mathada et al.

(10) Patent No.: US 12,462,792 B2
(45) Date of Patent: Nov. 4, 2025

(54) CONFIRMING REMOTE CONSUMER RECORDING PROPAGATION TO LIVE EVENT

(71) Applicant: INTERNATIONAL BUSINESS MACHINES CORPORATION, Armonk, NY (US)

(72) Inventors: Prasanna Alur Mathada, Bangalore (IN); Srini Bhagavan, Dublin, CA (US); Thuan D Ngo, Milpitas, CA (US); Hrishikesh Sujaya Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 18/057,271

(22) Filed: Nov. 21, 2022

(65) Prior Publication Data

US 2024/0169976 A1  May 23, 2024

(51) Int. Cl.
 *G10L 15/06* (2013.01)
 *G10L 15/26* (2006.01)
 *H04N 21/2187* (2011.01)

(52) U.S. Cl.
 CPC ............ *G10L 15/063* (2013.01); *G10L 15/26* (2013.01); *H04N 21/2187* (2013.01)

(58) Field of Classification Search
 CPC .... G10L 15/063; G10L 15/26; H04N 21/2187
 See application file for complete search history.

(56) References Cited

U.S. PATENT DOCUMENTS

| 9,066,144 | B2 | 6/2015 | Yerli |
| 2012/0224024 | A1 | 9/2012 | Lueth |
| 2018/0181365 | A1* | 6/2018 | Winton ............... G06F 3/04845 |
| 2020/0410998 | A1* | 12/2020 | Bar-On .................. G10L 13/00 |
| 2022/0086395 | A1 | 3/2022 | Petajan |
| 2022/0116463 | A1 | 4/2022 | Price |
| 2022/0247806 | A1* | 8/2022 | Cleveland .......... H04N 21/2408 |
| 2022/0345780 | A1* | 10/2022 | Shem Tov ......... H04N 21/4662 |

FOREIGN PATENT DOCUMENTS

| CN | 110473561 A | 11/2019 |
| CN | 113179416 A | 7/2021 |

OTHER PUBLICATIONS

Apple, FaceTime Apple App Store Preview, [accessed Nov. 10, 2022], 3 pgs., Retrieved from the Internet: <https://apps.apple.com/US/app/facetime/id1110145091>.

(Continued)

*Primary Examiner* — Daniel C Washburn
*Assistant Examiner* — Paul J. Mueller
(74) *Attorney, Agent, or Firm* — Caleb D. Wilkes

(57) ABSTRACT

A method, computer system, and a computer program product for propagating a recording are provided. A recording is received from a user computer. The received recording is analyzed. In response to determining based upon the analysis of the received recording that at least a portion of the recording is suitable for propagation, the portion of the recording is transmitted to a venue for playing of the portion. In response to the transmitting of the portion of the recording, a confirmation message is transmitted to the user computer.

20 Claims, 7 Drawing Sheets

(56) References Cited

OTHER PUBLICATIONS

Cisco, Webex website, [accessed Nov. 10, 2022], 25 pgs., Retrieved from the Internet: <https://www.webex.com/>.
Deccan Chronicle, "No More Silent Stadiums, Just Tap an App to Send Cheers to Support Your Team," Deccan Chronicle electronic paper, Published/Updated May 27, 2020, 11 pgs., Retrieved from the Internet: <https://www.deccanchronicle.com/technology/in-other-news/270520/no-more-silent-stadiums-just-tap-an-app-to-send-cheers-to-support-you.html>.
Disclosed Anonymously, "AI-Enhanced Virtual Attendance and Telepresence for Sports and Other Spectator Events", IP.com Prior Art Database Technical Disclosure, IP.com No. IPCOM000267299D, Oct. 14, 2021, 4 pgs.
Wikipedia, "Google Hangouts," Wikipedia entry, [accessed Nov. 11, 2022], 11 pgs., Retrieved from the Internet: <https://en.wikipedia.org/wiki/Google_Hangouts>.
Grace Period Disclosure: Disclosed Anonymously, "System and Method to Amalgamate, Play Plurality of Human Voices, that's in Sync with Live Sequence, Suits Ambience and Enhances Experience of an Ongoing Action/Event", IP.com Prior Art Database Technical Disclosure, IP.com No. IPCOM000268265D, Jan. 17, 2022, 6 pgs.
Haislop, "NFL game broadcasts in 2020: Explaining the fake crowd noise, other TV oddities amid Covid-19," The Sporting News, Oct. 18, 2020, 10 pgs., Retrieved from the Internet: <https://www.sportingnews.com/us/nfl/news/nfl-broadcasts-2020-fake-crowd-noise-explained/73nq9jby87yi1em47p84enrre>.
Maxwell, "Yamaha's 'Remote Cheerer' app is the most depressing way to fill empty stadiums with sound", Input online magazine, May 29, 2020, 6 pgs., Retrieved from the Internet: <https://www.inputmag.com/culture/yamahas-remote-cheerer-blares-applause-tracks-into-empty-stadiums>.
OZ News, "OZ Sports Uses Augmented Reality to Put Football Fans at the Heart of Closed-door Broadcasts," online published article at Oz.com, May 11, 2020, 9 pgs., Retrieved Nov. 10, 2022 through Web Archive located at <https://web.archive.org/web/20201205105238/https://web.oz.com/news/augmented-reality-to-put-football-fans-at-the-heart-of-closed-door-broadcasts>.
Park et al., "A Review of Speaker Diarization: Recent Advances with Deep Learning," arXiv:2101.09624v4 [eess.AS], Preprint submitted to Computer, Speech and Language, Nov. 26, 2021, 29 pgs.
World Economic Forum, "This app lets sports fans cheer out loud in the stadium when watching remotely," weforum.org, Jun. 17, 2020, 18 pgs., Retrieved from the Internet: <https://www.weforum.org/agenda/2020/06/sport-app-cheer-technology-japan-soccer-watch-remote-cheerer/>.
Yamaha, "Yamaha Reveals Remote Cheering System in Field Test Assisted by Two Professional Football Clubs in Japan," Yamaha.com, May 25, 2020, 7 pgs., Retrieved from the Internet: <https://www.yamaha.com/en/news_release/2020/20052501/>.
South China Morning Post, "Avatar robots replace Japanese students for graduation ceremony amid Covid-19 pandemic," Youtube.com, [accessed Nov. 10, 2022], 6 pgs., Retrieved from the Internet: <https://www.youtube.com/watch?v=WkBZbPy7P24&feature=emb_logo>.
Zoom, Zoom website, [accessed Nov. 10, 2022], 4 pgs., Retrieved from the Internet: <https://zoom.us/>.

* cited by examiner

CONFIRMING REMOTE CONSUMER RECORDING PROPAGATION TO LIVE EVENT

A document entitled "System and Method to Amalgamate, Play Plurality of Human Voices, that's in Sync with Live Sequence, Suits Ambience and Enhances Experience of an Ongoing Action/Event" was submitted anonymously to ip.com. That document was published as an ip.com prior art database technical disclosure (IPCOM000268265D) on 17 Jan. 2022. The subject matter of that document was created by the inventors of this present patent application and was disclosed less than one year prior to the priority date of this present patent application. Accordingly, that document is a grace period disclosure under 35 U.S.C. § 102(b)(1)(A).

BACKGROUND

The present invention relates generally to communication technology and to computer technology for facilitating interaction participants in events that are being broadcast live and to remote consumers, e.g., viewers and listeners, of those live events.

SUMMARY

A method, computer system, and a computer program product for propagating a recording are provided. A recording is received from a user computer. The received recording is analyzed. In response to determining based upon the analysis of the received recording that at least a portion of the recording is suitable for propagation, the portion of the recording is transmitted to a venue for playing of the portion. In response to the transmitting of the portion of the recording, a confirmation message is transmitted to the user computer.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1A:
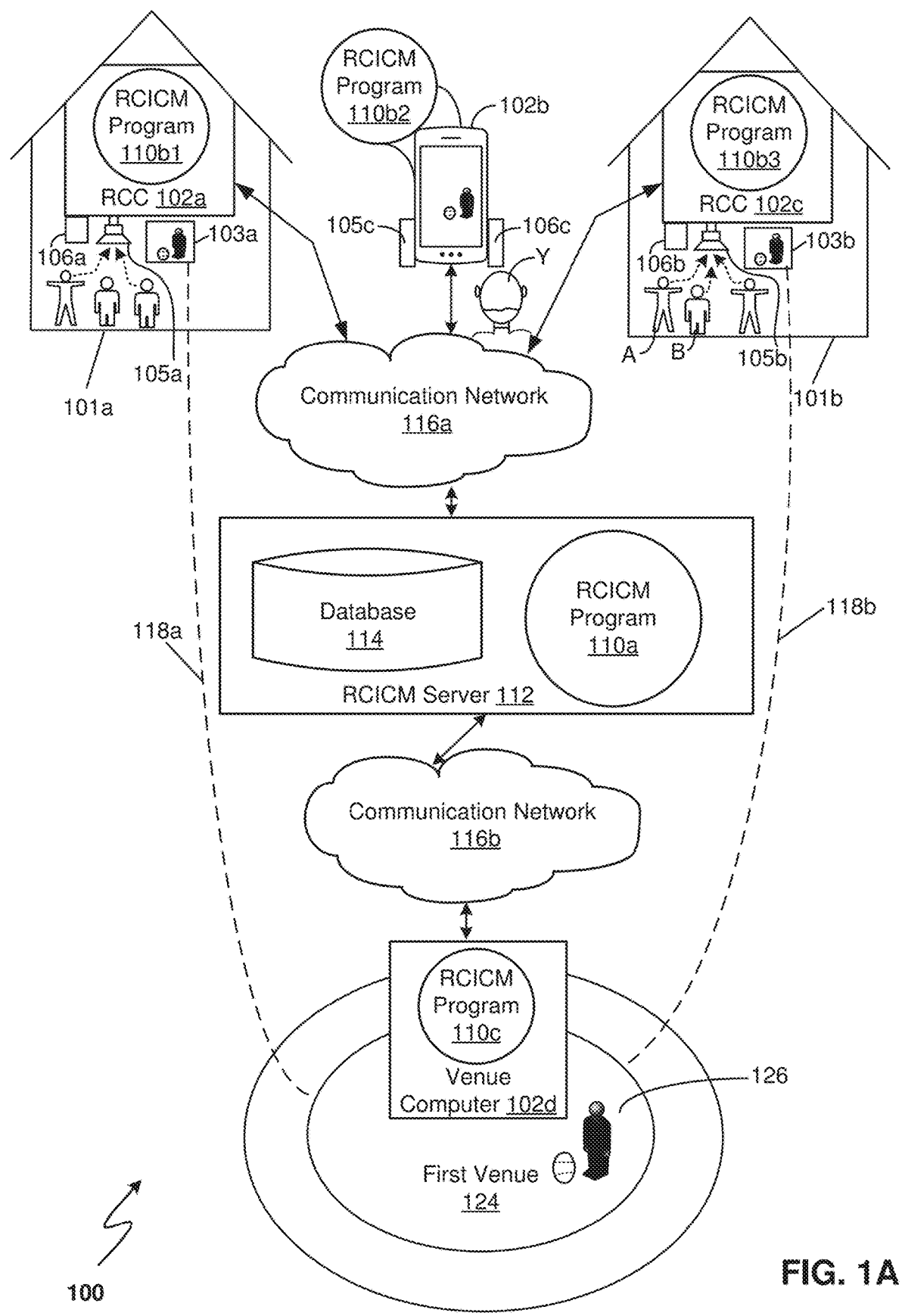
FIG. 1A illustrates a networked computer environment for audio recording propagation according to at least one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, and computer program product for enhancing remote consumer interaction with a live event that is being broadcast. Recent world events have resulted in some live events being broadcast without a live audience. Some sporting events have been played in venues such as stadiums, arenas, etc. without the usual fans and spectators who in the past have traveled to the venues to watch the events in person. Technology allows audio and video of the live events to be broadcast to viewers who are disposed remotely compared to the venue, but previous levels of spectator/event interaction have been lost. The participants in the live event such as sports players in a sporting event have not been able to hear the fans respond to the live event action, even if the remote audience has a strong reaction to parts of the live event. The remote consumers who form a remote audience and are at a first location remote from the event venue do not hear the audience reaction of other remote consumers who are watching and/or listening the live event from other locations that are remote from the event venue. Participants in the live event may miss out on energy bursts and energy transfers that can result from spectator engagement with the live event, in particular with the spectators generating noise and messages that can be heard and understood by the participants. Both the live event participants and the remote consumers have had a diminished experience.

The present embodiments will help improve communication technology by enhancing interaction of remote consumers with the live events that are being watched and/or listened to by the remote consumers. The present embodiments help provide a feedback loop for remote viewers/listeners, enhance propagation of a digital recording from the remote consumers, and help enhance the remote consumer interaction with the participants of a live event. Thus, the present embodiments may improve the library of communication software and technology. The loop may include transmitting audio and/or video from a virtual audience through for playing at the venue, and then are recorded at the venue and transmitted back to be heard and/or seen by members of the virtual audience. The present embodiments also help achieve positional sharing of a live event, whereby remote consumers share feedback from their own positions while remaining in comfort of a remote location and without needing to travel to a venue. The remote consumers obtain an enriched experience and can hear and be heard from their own remote seat/location. The present embodiments also leverage existing setup of broadcasts to create feedback loops for remote consumers to better interact with a live event.

With the present embodiments, reaction from the remote participants may be captured by the remote computers, transmitted back to the venue, and played at the venue during the live event. In this manner, the event participants are allowed to individually and/or collectively hear noise and/or see messages generated by the event remote consumers. The event remote consumers may in this manner fulfill a desire to interact with the event participants. With the present embodiments, an emotional connection between the remote participants and the live event/live event participants is enhanced as authentic remote consumer interaction is provided to the live event, to the live event participants, and to consumers, e.g., remote consumers, of the live event instead of artificial sounds and noises. The remote audience may feel teleported into the actual environment of the venue. The remote audience may receive a hands-free, keyword-free, trigger-free experience which allows the user to more fully enjoy and interact with the live event taking place at a remote location.

With the present embodiments, the event participants are provided with composition of live feedback such as remote audience reactions that may be based on location of action in near-real time. The present embodiments help event organizers to scale beyond venue capacity and to further monetize the consumption of the live event by remote consumers.

Referring to FIG. 1A, an audio recording propagation environment 100 in accordance with one embodiment is depicted. The audio recording propagation environment 100 may include a remote consumer interaction content management ("RCICM") server 112 that may communicate with remote computers which are capturing noise and optionally video from users who are watching a live event remotely. The remote consumer interaction content management server 112 may be in the cloud and may operate in a software-as-a-service manner. The remote consumer interaction content management server 112 may also communicate with venue computers such as the venue computer 104c. The venue computer 104c may be disposed at and/or be in communication with a venue such as the first venue 124 in which a live event is taking place. The live event may include one or more event participants such as the first participant 126. Video and/or audio of the live event is recorded at the first venue 124 and transmitted to remote participants for consumption, e.g., for watching and/or listening. For example, viewers at a first remote facility 101a and a second remote facility 101b may watch and/or listen to a live broadcast of the event that is occurring at the first venue 124. Other viewers in random remote locations may watch and/or listen to a live broadcast of the event using a portable computer such as the smart phone 102b which includes a display screen to show video that is recorded at the first venue 124. Such an event broadcast may occur via various communication networks such as the internet, over-the-air broadcast television, over-the-air broadcast radio, satellite transmission, and/or cable television transmission, etc.

If no or few spectators are allowed to be at the first venue 124 to personally watch the event taking place, the event participants and/or the event viewers may feel a communication void because the event participants do not hear noise and/or messages generated by the event viewers and because the event viewers do not a fulfill a desire to interact with the event participants. The present embodiments generate a way for the event consumers to in real-time receive noise and/or messages that are generated by remote consumers who are watching and/or listening to a broadcast of the live event.

The venue may refer to a physical structure such as an open-air stadium, a closed stadium such as indoor arena or a domed stadium, a building, a theater, etc. and in some instances to a physical location without a physical building, e.g., for the physical location at an area where an outdoor race such as a cross country race will be undertaken. The recording may be a digital recording and may include a signal that encodes something such as sound or picture. The digital recording may include an audio recording, a picture recording, and/or a video recording. The digital recording may be stored in computer memory, e.g., in a computer disk or hard-drive and transmitted in various computer transmission and wired or wireless transmissions.

The live event may be a concert, a sporting event, a debate, a discussion, a presentation, a protest, a game show, a talk show or some other situation in which people have gathered to watch and/or hear live participants. The present embodiments enhance communication technology and provide an improved way to help fight loneliness when gatherings are restricted for whatever reason. The present embodiments will help facilitate the art of right contact and will enhance the experience of mass viewers and participants.

FIG. 1A shows that multiple participants are viewing and/or hearing a broadcast of a live event taking place at the first venue 124. This broadcast may include video displayed at various remote facilities or on various remote devices such as on a first display screen 103a at the first remote facility 101a, on a display screen of the smart phone 102b, and on a second display screen 103b at the second remote facility 101b. The broadcast may also include audio played at speakers connected to and/or associated with the various display screens at the remote facilities/locations so that audio that is captured at the live event taking place at the first venue 124 may be played at the remote facilities for hearing by remote consumers.

With the present embodiments, recordings such as video recordings and audio recordings flow from remote consumers to the venue with the live event and not only from the live event to remote consumers. This return flow of recordings creates a feedback loop that may include an audio feedback loop and a video feedback loop. As shown in FIG. 1A, the remote consumers who are viewing the first display screen 103a and/or listening to an audio stream that is being played at the first remote facility 101a with sound from the live event may generate sounds, noise, and/or physical movement in response to the content of the live event. A first remote microphone 105a may capture sounds and/or noise generated by these remote consumers at the first remote facility 101a. The first remote microphone 105a itself may create an audio recording of the captured sound and/or a first remote consumer computer 102a that is connected to the first remote microphone 105a may create an audio recording after the first remote microphone 105a transmits the captured sound to the first remote consumer computer 102a. The first remote microphone 105a may have a wired and/or wireless connection to the first remote consumer computer 102a. Such connection allows the sound wave/recording transmission from the microphone to the computer. The program 110b1, the first remote microphone 105a, and/or the program 110a, e.g., the audio mixer at the program 110a, may cap the noise level at a specified amount.

The feedback loop further includes the first remote consumer computer 102a transmitting the digital recording of the remote consumer interaction to the remote consumer interaction content management ("RCICM") server 112. The remote consumer interaction content management program 110a of the remote consumer interaction content management ("RCICM") server 112 in at least some embodiments may analyze the received digital recording for suitability for propagation of the digital recording to the first venue 124.

The feedback loop further includes the remote consumer interaction content management server 112 transmitting the digital recording to the venue computer 102d at and/or associated with the first venue 124. In at least some embodiments this transmission may occur in response to determining that at least a portion of the digital recording is suitable for propagation. This suitability determination may be made based on the analysis performed via the program 110a on the digital recording. The suitability determination may be based on a variety of factors such as irrelevance to the live event (e.g., background chatter), a curse word, vulgarity, hate speech, violent words, and sound quality (e.g., decibel level too high).

In at least some embodiments, the analysis includes the program 110a performing speech-to-text transcription of content of an audio recording portion of the digital recording. This speech-to-text transcription may produce a text block and the program 110a may analyze the text block, e.g., using natural language processing and a stored dictionary for filtering out inappropriate terms such as profanity and vulgarity. The program 110a may include a filter/cleansing module to filter out unintended conversations, profanity-laced statements, swear words, vulgarity, violent words, hate speech, etc. Additionally and/or alternatively, the analysis includes the program 110a performing machine learning analysis of the digital recording. A machine learning model used for this analysis may be stored at the server 112 or at another remote server 504 that is in communication with the server 112. In at least some embodiments the machine learning analysis is performed on an audio recording portion of the digital recording. The determination of whether the audio recording is suitable for propagation to the venue computer 102d in this embodiment is based on an output of the machine learning analysis. In additional embodiments, the program 110a additionally and/or alternatively performs machine learning analysis of a video recording portion of the digital recording. The determination of whether the audio recording is suitable for propagation to the venue computer 102d in this embodiment is based on an output of the machine learning analysis. The machine learning model used for the video recording analysis may be the same as or different from the machine learning model that is used for the audio recording analysis.

In at least some embodiments, the program 110a performs analysis of the received audio recording by comparing the received audio recording to stored audio samples associated with the user device. The stored audio samples may include a voice recording of a first voice. The determining that the audio recording is suitable for propagation may be based on the received audio recording including a recording of a consumer voice which matches the first voice. Thus, a remote consumer may set up a personal subscription with the program 110b1, 110a so that the remote interaction, e.g., noise, of one particular remote consumer is captured and transmitted for playing at the venue. In at least some embodiments, the stored audio samples include voice recordings of multiple voices. Thus, one or more remote consumers may set up a group subscription with the program 110b1, 110a so that the remote interaction, e.g., noise, of multiple remote consumers is captured and transmitted for playing at the venue.

In at least some embodiments, the analysis of the received audio recording includes comparing the received audio recording to a stored dictionary comprising acceptable sounds, unacceptable sounds, acceptable vocabulary, and/or unacceptable vocabulary. Dictionary entries may be based on historical references and experiences of a venue and/or a remote user and/or an official of the remote consumer interaction content management program 110a, 110b1, 110b2, 110b3, 110c. The determining that the audio recording is suitable for propagation is based on the portion of the received audio recording matching the acceptable sounds. For a second portion of the audio recording that is not transmitted to the venue, the program 110a may block the second portion from transmission to the venue due to the second portion matching the unacceptable sounds saved in the stored dictionary.

After being received via the venue computer 102d, the venue computer 102d transmits the digital recording to one or more audio speakers at the first venue 124. The remote consumer interaction content management program 110c on the venue computer 102d may govern the sound system of the venue and have a wired or wireless connection with each audio speaker and/or microphone of the venue. The audio speakers play the digital recording at the first venue 124 which allows participants of the live event at the first venue 124 to hear and/or see the digital recording. This transmission may be of a portion of the total digital recording. The transmitted portion may be that portion which the program 110a found to be suitable for propagation, while another portion of the received recording may be removed and not transmitted to the venue due to the program 110a determining that that other portion was not suitable for propagation to the venue for broadcast there at the live event. Speakers in the present disclosure refers to audio speakers that are electroacoustic devices and transducers that convert electromagnetic waves into sound waves. The sound system may play out the recording that was generated by an audio mixer of the program 110c and transmitted to the venue.

With this feedback loop of the present disclosure, the remote consumers cheering of the live event may be transmitted to and heard by participants of the live event, even though the remote consumers are not physically present at the first venue 124 at which the live event is taking place.

The initial broadcast of the live event continues to capture video and/or audio of the live event taking place at the first venue 124, e.g., via the use of cameras recording images/video and/or microphones recording sound. This broadcast may, therefore, also capture sound generated from the remote consumers that was piped to the first venue 124 and played at the first venue 124. FIG. 1A shows an example of first and second broadcast streams 118a, 118b being transmitted from the first venue 124 to the first display 103a at the first remote location 101a and to the second display 103b at the second remote location 101b, respectively. The remote consumers may hear their own noise, cheers, boos, etc. over the main broadcast. This playback illustrates one aspect of the feedback loop between the live event and the remote consumers—with the remote consumer interaction starting at the remote facility, being transmitted to the venue, and then being transmitted back to the remote facility. Thus, the first and second broadcast streams, e.g., the traditional broadcast streams, may be part of a first feedback loop.

These broadcast streams may use the communication networks 116a, 116b or their own wire solution, e.g. with cable internet television.

In at least some embodiments, the server 112 may receive from the first remote consumer computer 102a a selection for sound that is recorded from a particular microphone of multiple microphones at the venue. The audio that is transmitted from the venue to the first remote consumer computer 102a may be from this selected microphone. In this manner, the remote consumer may choose to follow the live event action from a certain section, cross-section, and/or directly from an area where the live event action takes place.

Figure 1B:
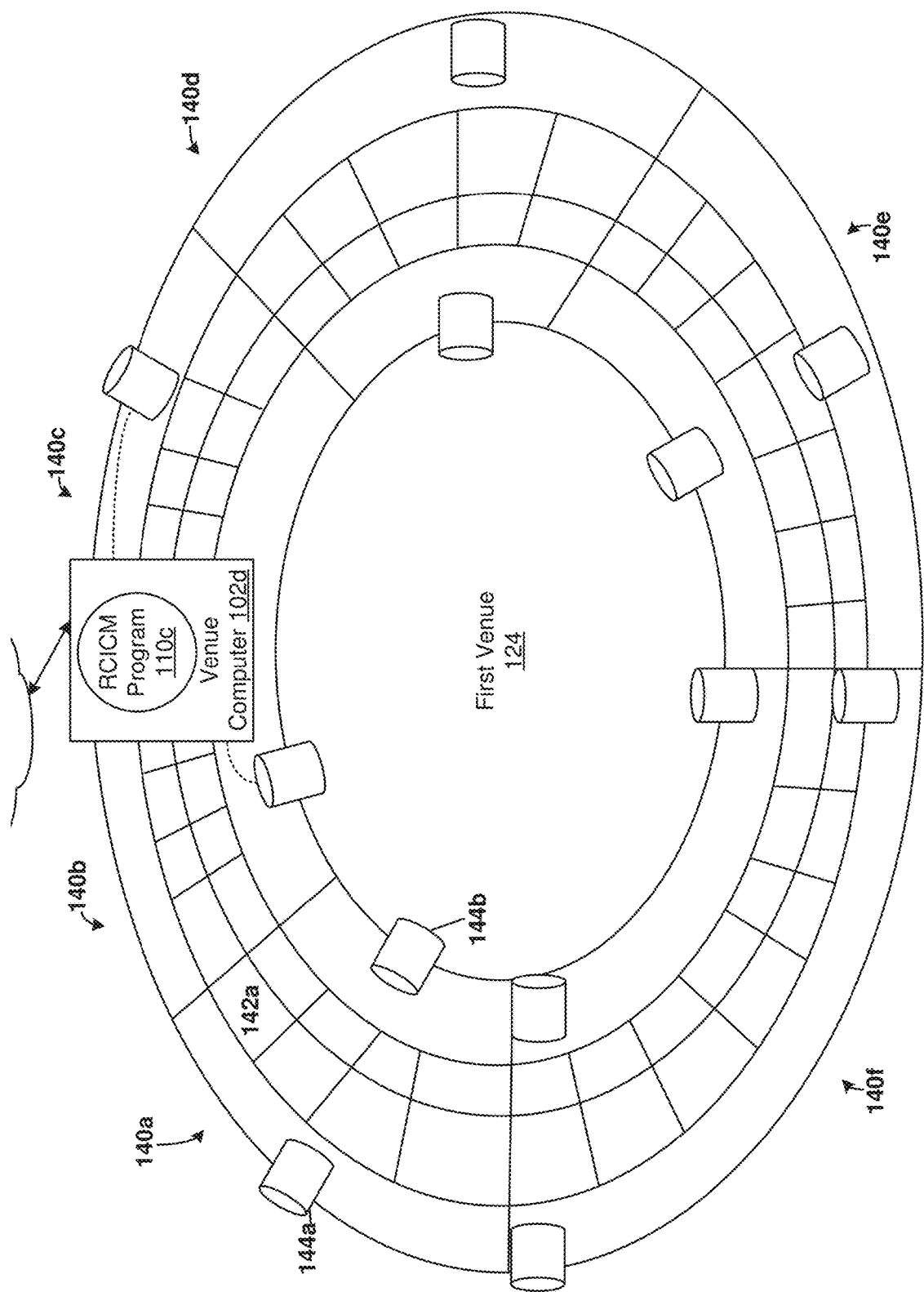
FIG. 1B illustrates a venue for receiving recording propagation and playing recordings from remote consumers according to at least one embodiment.

FIG. 1B shows an example of multiple speakers/microphones distributed around the first venue 124. The cylinder-shaped objects in FIG. 1B represent the speakers/microphones, with a single cylinder-shaped object being an example of a speaker/microphone combination. A first speaker/microphone 144a and a second speaker/microphone 144b are each labeled and disposed in a first section 140a of the first venue 124. FIG. 1B shows that spectator seats for the first venue 124 are divided into various sections, in this example a first section 140a, a second section 140b, a third section 140c, a fourth section 140d, a fifth section 140e, and a sixth section 140f. FIG. 1B shows that each of the sections may include spectator seats, e.g., with the first section 140a including a first spectator seat 142a. FIG. 1B shows that each section of the first venue 124 includes one or more, e.g., two or more, speaker/microphones disposed therein/thereby. The sixth section 140f is shown as having four speaker/microphones disposed therein/thereby. In some embodiments, one of the structures may form both a speaker and a microphone, with a speaker cone also acting as a large microphone diaphragm for capturing sound. In other embodiments, a speaker/microphone structure may be formed with separate structures for generating and capturing sound, e.g., with a first cone for the speaker for generating and magnifying sound and a second cone for capturing/recording sound that is generated in the environment. These structures may include a sound event detector and/or an acoustics event detector to effectively capture live sound/noise from the venue, form a recording of same, and transmit the recording for playing back at the remote locations.

The program 110b1 may generate for the user/remote consumer a display and/or list of the possible microphone choices and may allow a user to select one of the microphones for receiving the audio that is captured/recorded by same. Thus, the user may be able to customize their viewing/listening experience to correspond to how the user would hear noise/sound from the live event if the remote consumer were sitting at a particular seat and/or in a particular section of the venue. Choosing a microphone closer to the live event area may allow a remote consume to hear comments from participants of the live event. Choosing a microphone closer to a section designated for a particular group of fans may allow the user to better hear noise generated from other remote consumers having a shared rooting interest, e.g., a particular team/player, for the live event. For example for a sporting event, fans of one team/player may select to receive sound from a first section of the stadium in which remote noise from other fans of that team/player are played and fans of an opposing team/player may select to receive sound from a different second section of the stadium in which remote noise from fans of an opposing team/player are played. A remote consumer may make a selection to have the sound for their broadcast stream be selected from a particular microphone amongst multiple microphones. In other embodiments, a remote user may choose to receive sound from a general, e.g., centralized, microphone for the venue 124 which captures audio without favoring a particular section. Such a general microphone may be disposed in a central portion of the first venue 124, e.g., in a microphone disposed on a playing field/court of the first venue 124 or disposed directly above a playing field/court of the first venue 124. In some embodiments in which a majority of fans at the first venue 124 support one particular team/player amongst those competing, the general microphone is more likely to capture noise from fans supporting the favored team/player.

In some embodiments, the portion of the audio recording recorded from the remote consumers and transmitted to the venue is transmitted with an indicator designating a first speaker amongst multiple speakers at the venue for audible playing of the transmitted portion at the first speaker. The first speaker is associated with a selected first microphone by being positioned in a same first section of the venue. Thus, in this embodiment the remote consumer may choose to have their sound output in the same venue section in which they receive captured sound for the broadcast of the live even that is transmitted to the respective remote consumer. FIG. 1B shows the venue computer 102d having a connection with the second communication network 116b which was shown in FIGS. 1A and 1s subsequently described herein. The venue computer 102d may receive via the second communication network 116b the incoming propagated digital recording with a designation for the particular speaker. The remote consumer interaction content management program 110c of the venue computer 102d may follow the designation to route that digital recording for playing at the particular speaker. For example, the remote consumer may designate that the first speaker/microphone 144a should play the digital recording captured at the first remote facility 101b. The venue computer 102d may receive the digital recording and the designation for the playing with the first speaker/microphone 144a and may, in response to reading the designation, transmit the digital recording to the first speaker/microphone 144a. In response to receiving this digital recording, the first speaker/microphone 144a may play the digital recording. Thereby, participants in the live event taking place at the first venue 124 may hear the authentic sound that was generated and captured at the remote facility 101a.

The remote content may be played at the venue at a selected decibel range not to exceed health and safety requirements for decibel levels.

Another aspect of the feedback loop occurs via the remote consumer interaction content management server 112 generating and transmitting a confirmation message back to the remote consumer interaction content management program 110b1 at the first remote consumer computer 102a to confirm the propagation of the digital recording to the venue computer 102d. In response to receiving this confirmation message, the remote consumer interaction content management program 110b1 at the first remote consumer computer 102a may play the confirmation message to the remote users. This playing may occur visibly via a display screen of the first remote consumer computer 102a and/or audibly via an audio speaker of the first remote consumer computer 102a and/or via some other communication form from the first remote consumer computer 102a. This confirmation helps the remote consumers appreciate that their remote interaction will be played at the venue. This confirmation can encourage the remote consumers to continue their interaction and/or to improve and/or increase their interaction. Thus, this additional feedback loop occurs in FIG. 1A through the double-sided arrows shown between the RCICM server 112, the first communication network 116*a*, and the remote computers 102*a*, 102*b*, and 102*c*. Although the remote consumers may receive the confirmation message from the server 112 simultaneously to, before, and/or after the recording from the remote consumer being published/played at the venue, the confirmation message ensures the remote consumer that this publishing/playing will take place. The confirmation message provides engagement feedback for the remote consumers. The confirmation message is separate from confirmation that may occur when a remote viewer hears newly broadcast sound along with the main broadcast stream. In at least some embodiments, the confirmation message is sent in a separate transmission from the main broadcast stream of the live event.

The transmitted portion of the audio recording in some embodiments includes a first portion. A second portion of the audio recording in some embodiments is not transmitted to the venue. The confirmation message in at least some embodiments includes feedback indicating a first explanation for transmission of the first portion and a second explanation for the non-transmission of the second portion. In at least some embodiments the explanations are generated based on explainability/interpretability of artificial intelligence such as machine learning models. With the explainable artificial intelligence, the artificial intelligence acts a clear box which provides human-understandable reasons for classification and decision-making. The confirmation message in at least some embodiments includes feedback indicating a first amount percentage of the first portion (transmitted to the venue computer 102*d* for broadcast at the live event at the first venue 124) compared to a total content of the received audio recording. The confirmation message in at least some embodiments includes a second amount percentage of the second portion (not transmitted to the venue computer 102*d*) compared to the total content of the received audio recording.

Figure 1C:
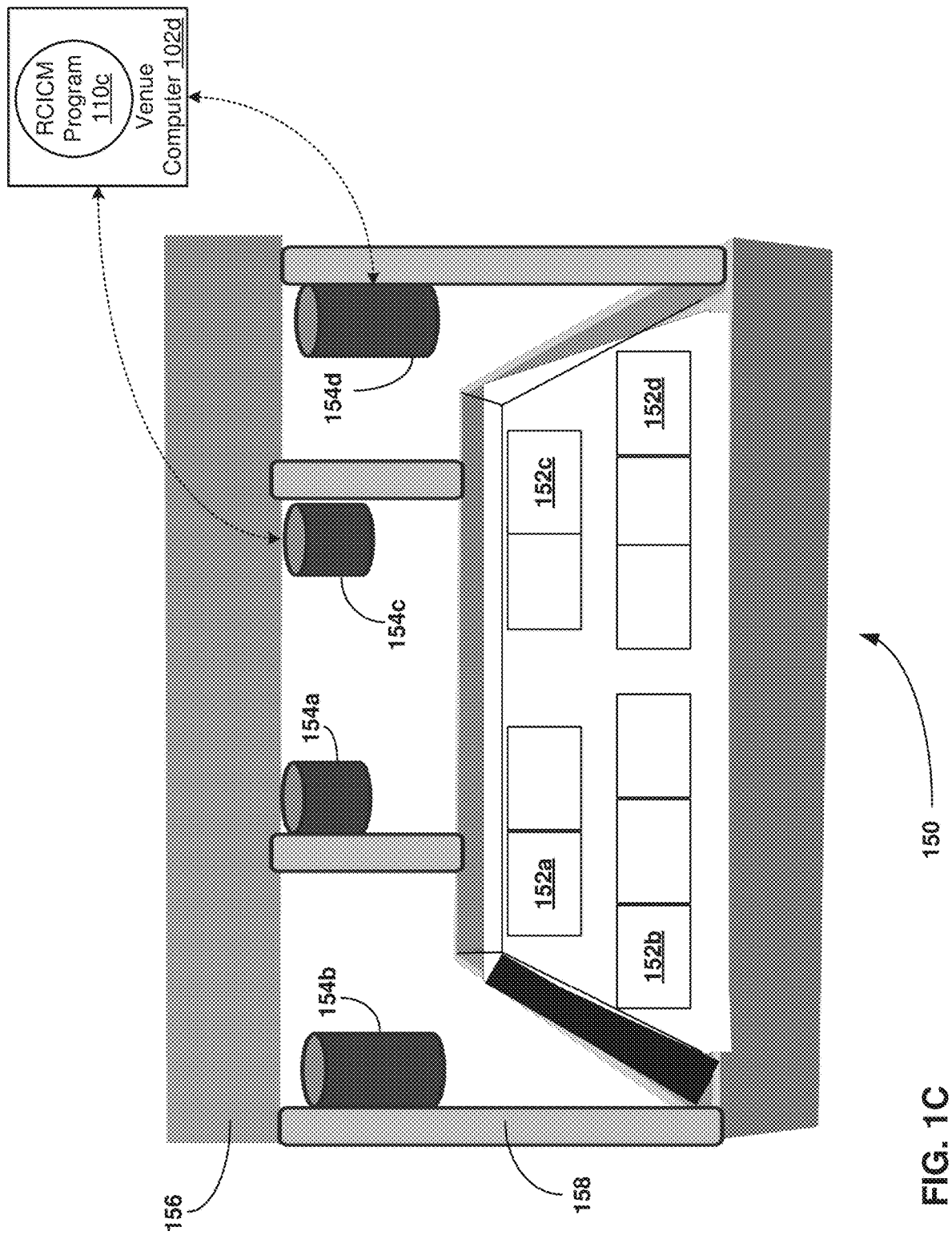
FIG. 1C illustrates a venue section for receiving recording propagation and playing recordings from remote consumers according to at least one embodiment.
Figure 1D:
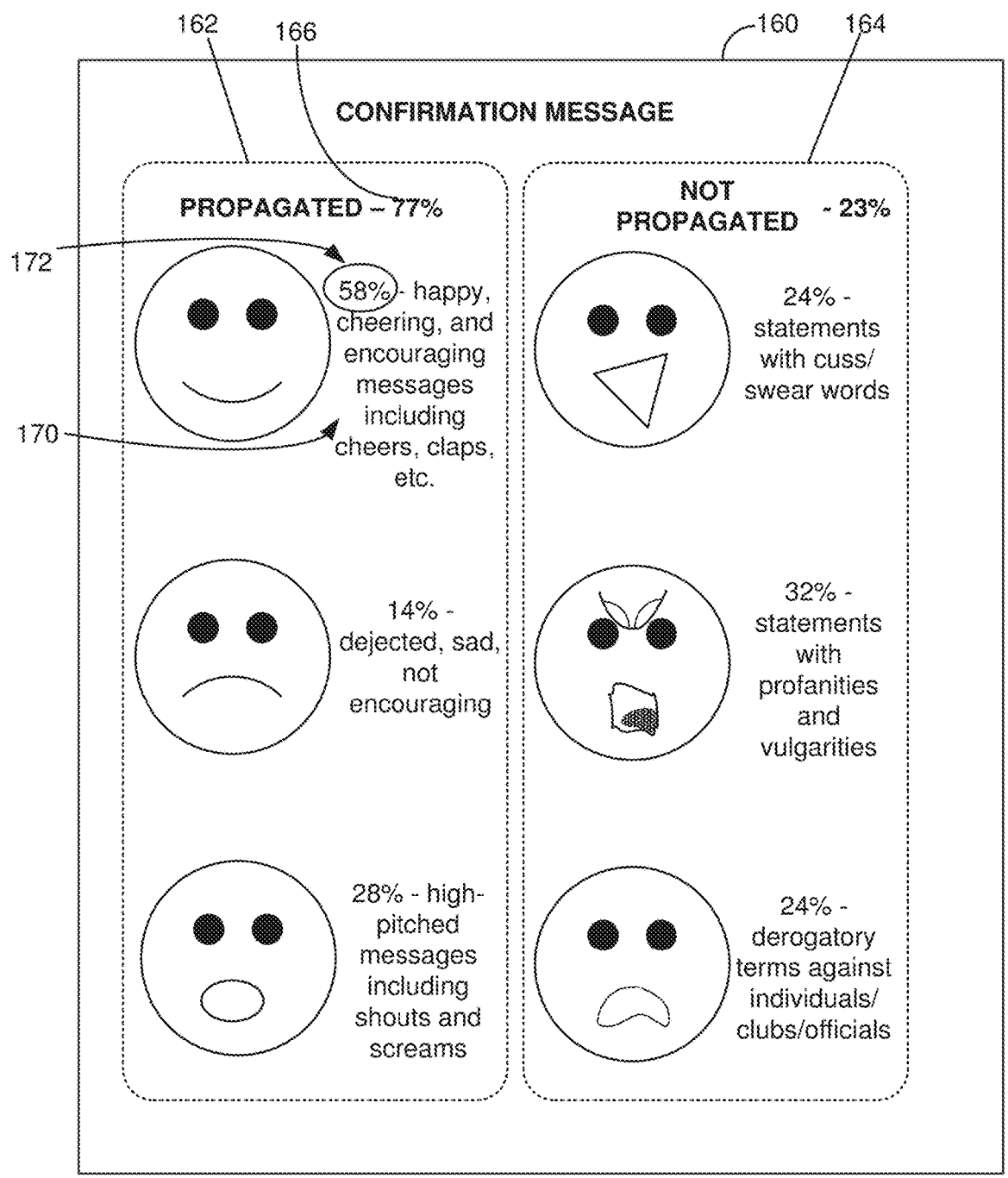
FIG. 1D illustrates a confirmation message transmitted to a remote consumer upon successful propagation of the remote consumer recording according to at least one embodiment.

FIG. 1D shows an example of a first confirmation message 160 that is generated, transmitted, and played according to at least some embodiments. For the above embodiments described with respect to FIG. 1A, the remote consumer interaction content management program 110*a* at the server 112 may generate this first confirmation message 160 in response to receiving and analyzing remote content received from the remote consumer interaction content management program 110*b*1 at the first remote consumer computer 102*a*. The server 112 may transmit this first confirmation message 160 to the first remote consumer computer 102*a* at the first remote facility 101*a* for playing of the confirmation message 160 visibly on a display screen and/or audibly via a speaker associated with and/or connected to the first remote consumer computer 102*a*.

FIG. 1D shows that the first confirmation message 160 includes propagated message feedback 162 and non-propagated message feedback 164. The propagated message feedback 162 shows feedback related to portions of digital recording that the remote consumer interaction content management program 110*a* at the server 112 further passed onto the venue computer 102*d* for playing at the first venue 124. The non-propagated message feedback 164 shows feedback related to portions of digital recording that the remote consumer interaction content management program 110*a* at the server 112 blocked and did not pass onto the venue computer 102*d*. These feedback portions include reasoning, e.g., adequate reasoning, for the propagation or non-propagation, e.g., for the broadcasting or non-broadcasting of the particular portions. FIG. 1D also includes a first amount percentage 166 that the propagated portion is 77% of the overall content amount of the digital recording received from the particular remote consumer computer 102*a*. FIG. 1D likewise shows that the non-propagated portion is 23% of the overall content amount of the digital recording received from the particular remote consumer computer 102*a*. Amongst the different feedback portions, FIG. 1D shows a feedback sub-group amount percentage 172 which shows the amount of feedback for the suitable or non-suitable type compared to the overall content of the particular type. For example, in FIG. 1D the feedback sub-group amount percentage 172 is 58% of the propagated material and fell into a sub-group of happy, cheering, and encouraging messages including cheers, claps, etc. In the depicted embodiment, 14% of the broadcast material fell into a sub-group of sounds characterized as dejected, sad, and not encouraging and 28% of the broadcast material was characterized as belonging to a sub-group of high-pitched messages including shouts and screams.

Similarly, in FIG. 1D the non-propagated feedback included sub-groups of 24% having statements with cuss/swear words, 32% having statements with profanities and/or vulgarities, and 24% had statements with derogatory terms against individuals/clubs/officials associated with or participating in the live event. Due to the negative nature of these statements, these statements are blocked by the program 110*a* for further propagation to the remote consumer interaction content management program 110*c* at the venue computer 102*d*. Multiple confirmation messages with propagation statistics and reasoning including updated reasoning may be sent in segments throughout the duration of a broadcast live event.

In some embodiments, an initial confirmation message may include the broadcast amount and non-broadcast amount of the overall consumer recording and include links which the user may select to generate the more-detailed statistics and description of the reasoning for the various categories. After clicking on these links, the more-detailed view such as is shown in FIG. 1D may be generated. In some embodiments, the specific remote consumer statements that fall into the various categories may be provided along with the percentage amounts.

In some embodiments, the confirmation message may include recommendations of how the remote consumers may adjust their responses for having greater amounts of their recordings propagated to the venue for playing there. In at least some embodiments, the server 112 receives a selection from the remote consumer computer 102*a*. The selection includes a first speaker from multiple speakers at the venue. The portion of the audio recording that is transmitted to the venue is transmitted with an indicator designating the selected first speaker for audible playing of the transmitted portion. FIG. 1B shows that multiple speakers, e.g., first and second speakers 144*a*, 1144*b*, are present at the venue which may be used to audibly play an audio recording received from the remote consumers.

In at least some embodiments, the server 112 receives a selection from the remote consumer computer 102*a*. The selection includes a choice for audio aggregation from the remote consumer computer 102*a*. In response to receiving the selection for audio aggregation, the program 110*a* aggregates the portion of the audio recording received from the first remote consumer computer 102*a* with additional received audio recordings to form an aggregated audio recording. Such additional received audio recordings may, for example, be received from other remote consumers who are viewing at the remote smart phone 102*b* and/or at the second remote consumer computer 102*c* that is disposed at the second remote facility 101b. The program 110a may perform the aggregation from the various streams emerging from a plurality of remote computers. After performing this aggregation of multiple audio recordings from multiple feeds, the program 110a transmits aggregated audio recording to the venue for audible playing of the aggregated audio recording. The program 110a may include an audio mixer to perform this aggregation. The program 110a may retain in the aggregated stream a decibel range and frequency of an individual audio recording that is input to the audio mixer. The program 110a may also remove decibels of the input streams that exceed a health and safety requirement for listening at the venue.

The remote consumer interaction content modification program 110b1, 110b2, 110b3, 110a, and 110c may be a software application, e.g., an app, may be established as a web-based console or service integrated with an artificial intelligence assistant, and can provide a hands-free, keyword-free, trigger-free experience to a remote consumer so that the remote consumer can more fully enjoy the live event taking place at a remote location.

FIG. 1A shows the first remote consumer computer 102a, the remote smart phone 102b, the second remote consumer computer 102c, a remote consumer interaction content management server 112, and a venue computer 102d are each enabled to run remote consumer interaction content modification program 110b1, 110b2, 110b3, 110a, and 110c, respectively. The remote consumer interaction content management server 112 is a computer and stores the remote consumer interaction content modification program 110a that may interact with a database 114. The first remote consumer computer 102a, the remote smart phone 102b, and the second remote consumer computer 102c may communicate with the remote consumer interaction content management server 112 via a first communication network 116a. The remote consumer interaction content management server 112 may communicate with the venue computer 102d via a second communication network 116b. The audio recording propagation environment 100 may include many computers and many servers, although four computers and one server 112 are shown in FIG. 1A. The first and the second communication network 116a, 116b allowing communication between the computers and the server may in some embodiments be the same communication network and may include various types of communication networks, such as the Internet, a wide area network (WAN), a local area network (LAN), a telecommunication network, a wireless network, a public switched telephone network (PTSN) and/or a satellite network. It should be appreciated that FIG. 1A provides only an illustration of one implementation and does not imply any limitations with regard to the environments in which different embodiments may be implemented. Many modifications to the depicted environments may be made based on design and implementation requirements. The first and the second communication network 116a, 116b may include connections, such as wire, wireless communication links, or fiber optic cables. The first and the second communication network 116a, 116b may itself include multiple servers such as a network edge server and an edge/gateway server which may be enabled to run or assist in operation of the remote consumer interaction content management. The first and the second communication networks 116a, 116b may in some embodiments be or include high speed networks such as 4G and 5G networks. Implementing the present remote consumer interaction content management embodiments in a 5G network will enable at least some embodiments to be implemented on the edge in order to boost network performance and reduce recording transmission lag times between the venue and the remote consumers and vice-versa.

Figure 3:
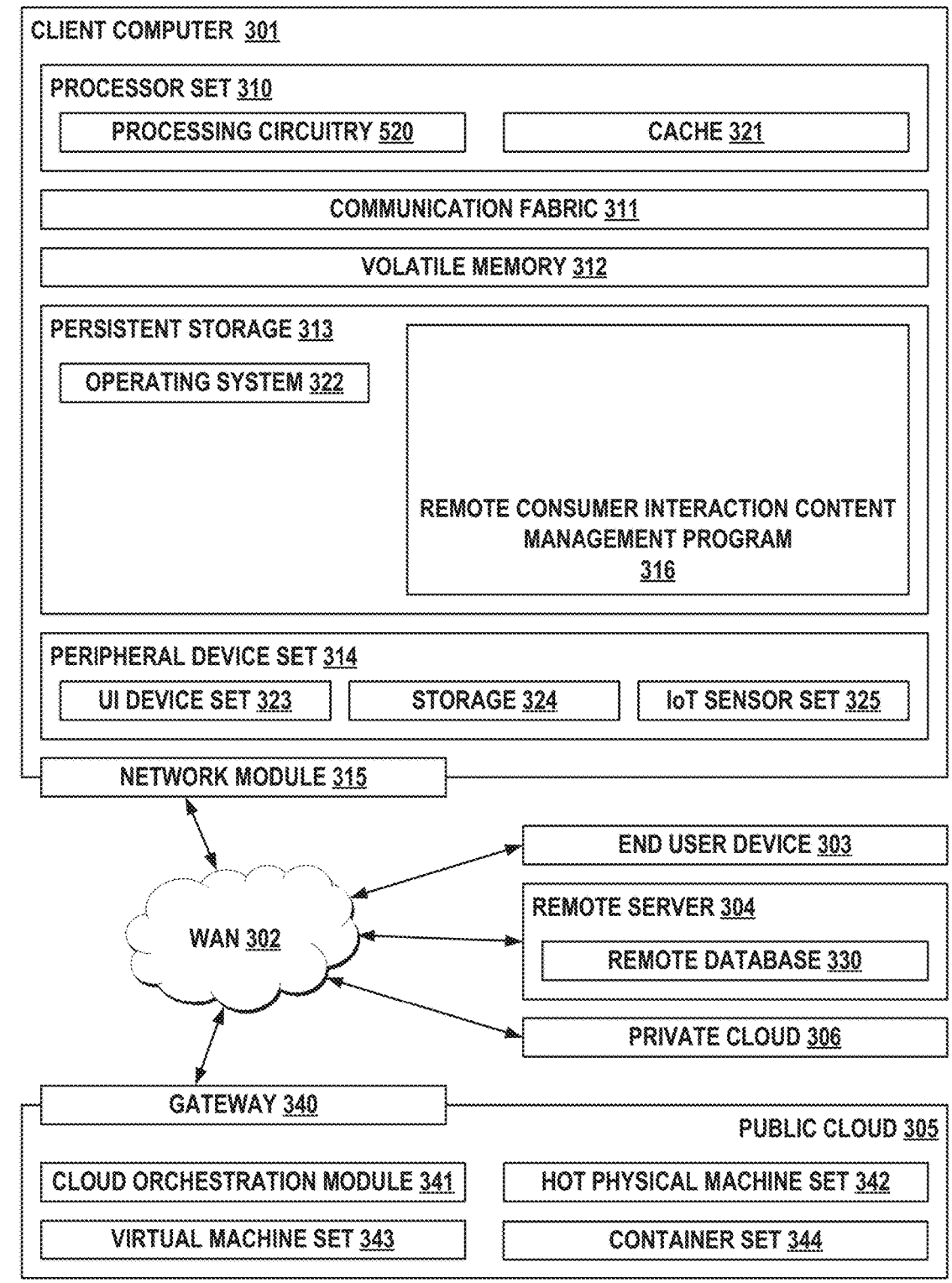
FIG. 3 is a block diagram illustrating a computer environment with multiple computer systems in which the remote consumer recording preparation process described for FIG. 2A and the remote consumer recording propagation process described for FIG. 2B may be implemented.

As will be discussed with reference to FIG. 3, the server 112 may be a mainframe server and may include the components of the client computer 501. Each of the first remote consumer computer 102a, the remote smart phone 102b, the second remote consumer computer 102c, and the venue computer 102d may also include equivalent components of the client computer 501 shown in FIG. 3. The server 112 may also in some embodiments relationally be equivalent to the remote server 504 shown in FIG. 3. The first remote consumer computer 102a, the remote smart phone 102b, the second remote consumer computer 102c, and the venue computer 102d may also in some embodiments relationally be equivalent to the end user device 503 shown in FIG. 3. Server 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. The first remote consumer computer 102a, the remote smart phone 102b, the second remote consumer computer 102c, and the venue computer 102d may each be, for example, a mobile device, a telephone, a personal digital assistant, a netbook, a laptop computer, a tablet computer, a desktop computer, or any type of computing devices capable of running a program, accessing a network, and accessing a database 114 in the server 112 that is remotely located with respect to the first remote consumer computer 102a, the remote smart phone 102b, the second remote consumer computer 102c, and the venue computer 102d. The first remote consumer computer 102a, the remote smart phone 102b, the second remote consumer computer 102c, and the venue computer 102d may each include a display screen, a speaker, a microphone, a camera, and a keyboard or other input device for better receiving, analyzing, and managing remote consumer interaction content. According to various implementations of the present embodiment, the remote consumer interaction content management program 110a, 110b1, 110b2, 110b3, 110c may interact with a database 114 that may be embedded in various storage devices, such as, but not limited to a various computers/mobile devices, a server 112 that may be in a network, or another cloud storage service.

Usage of storing content on edge servers may reduce network traffic that is required for the content feedback loop and digital recording transmission described herein. This reduction in network traffic may help achieve efficient processing for execution of the methods according to the present embodiments. The remote consumers and a venue computer may utilize their network infrastructure to gain appropriate connectivity, e.g., 5G connectivity, into the environment. The present embodiments may take advantage of existing and future 5G infrastructure and its increase of bandwidth, latency, and scaling of applications requiring large amounts of real-time data. The server 112 may trigger data and command flows to be processed by distributed enhanced experience capability programs that are available at a network edge server located at a network edge and/or that are available at an edge/gateway server located at a network gateway. User profile interaction customization and profiles can also flow from the edge gateway/server through the network edge server for access by the server 112 which implements enhanced remote consumer interaction content management as part of the content loop.

A computer system with the remote consumer interaction content management program 110a, 110b1, 110b2, 110b3, 110c operates as a special purpose computer system in which the remote consumer interaction content management process 200 assists in the propagation of remotely generated content for playing to participants at a live event. In particular, the remote consumer interaction content management program 110a, 110b1, 110b2, 110b3, 110c transforms a computer system into a special purpose computer system as compared to currently available general computer systems that do not have the remote consumer interaction content management program 110a, 110b1, 110b2, 110b3, 110c.

FIG. 1C illustrates a venue section for receiving audio recording propagation and playing audio recorded from remote consumers according to at least one embodiment. Thus, the venue section shown in FIG. 1C implements many similar design entities and communication aspects as were described with respect to FIGS. 1A and 1B. FIG. 1C shows a venue box 150 which is in a particular section of a venue or itself forms a section of a venue, e.g., the first venue 124 shown in FIGS. 1A and 1B. This venue box 150 includes four microphones/speakers that are in communication with the venue computer 102d with the remote consumer interaction content management program 110c. These microphones/speakers include a first box microphone/speaker 154a, a second box microphone/speaker 154b, a third box microphone/speaker 154c, and a fourth box microphone/speaker 154d. Spectator seats of the venue box 150 are also divided into sections, e.g., into a first box section, a second box section, a third box section, and a fourth box section. FIG. 1C shows that each of the box microphones/speakers is associated with a respective box section by being positioned directly above the respective box section. FIG. 1C shows that the various box microphones/speakers are connected to a box overhang 156 and/or to a support pillar 158 that extends between the box foundation and the box overhang 156. Attaching the microphone/speaker in an overhead position above the seats allows the microphone to capture sound waves that travel above the seats and allows the speaker to broadcast sound waves towards a central part of the venue, e.g., a playing field/court of the venue, without being impeded by physical structure such as seats of the venue.

In some embodiments, remote consumers register to be associated with a particular seat of the venue. The remote consumer may register from the local copy of the remote consumer interaction content management program on their respective computer, e.g., the remote consumer interaction content management program 110b1 on the first remote consumer computer 102a, the remote consumer interaction content management program 110b2 on the smart phone 102b, and the remote consumer interaction content management program 110c on the second remote consumer computer 102c. The program may generate a display and/or listing of available seats of the venue for the remote user to respectively occupy. This occupying may include having the remote sound generated for the respective remote user piped for audible playing at the venue speaker associated with the selected seat. The registration may include a virtual seat number being assigned for each registered user.

For example, if a remote consumer associated with the first remote consumer computer 102a at the first remote facility 101a registers to virtually occupy first box seat 152a, then sound captured at the first remote facility 101a is transmitted for playing via the first box microphone/speaker 154a. Similarly, another remote consumer such as phone user Y (view shown in FIG. 1A is the back of the head of phone user Y) associated with the remote smart phone 102b at a movable remote location registers to virtually occupy second box seat 152b, and sound captured at the remote smart phone 102b is transmitted for playing via the second box microphone/speaker 154b that is associated with the second box seat 152b. This sound may be captured via a smart phone microphone 105c attached to or in the remote smart phone 102b. Likewise, a further remote consumer associated with the second remote consumer computer 102c at the second remote facility 101b registers to virtually occupy third box seat 152c, and sound captured at the second remote facility 101b is transmitted for playing via the third box microphone/speaker 154c that is associated with the third box seat 152c.

In at least some embodiments, another remote consumer associated with the second remote consumer computer 102c at the second remote facility 101b registers to virtually occupy the fourth box seat 152c, and sound captured at the second remote facility 101b and voice matched to this further remote consumer is transmitted for playing via the fourth box microphone/speaker 154d that is associated with the fourth box seat 152d. This aspect illustrates how the remote consumer interaction content management program may use voice recordings to distinguish between multiple persons speaking at a single remote location. This distinguishing may also result in the program 110c separating the single input stream voice recording captured at the single remote location into multiple audio streams—with the noise response for one remote participant being provided per separated audio stream. Thus, the noise and cheering and comments from remote consumer A at the second remote facility 101b may be separated into a first stream for playing at a first venue speaker (e.g., the third box microphone/speaker 154c), and the noise and cheering and comments from remote consumer B also at the second remote facility 101b may be separated into another stream for playing at another venue speaker different than the first venue speaker (e.g., the fourth box microphone/speaker 154d or at a venue speaker in an entirely different section of the venue).

In some embodiments, a display screen is also provided at each seat of the venue and/or at each section of the venue. The display screen may protrude upwards from the respective seat so that participants on an event area of the venue may see video content displayed on the respective display screen. For example, video captured via the first remote camera 106a at the first remote facility 101a may in this embodiment be transmitted for playing via a display screen associated with the first box seat 152a. Video captured via a smart phone camera 106c attached to the remote smart phone 102b may in this embodiment transmitted for playing via a display screen associated with the second box seat 152b. Video captured via a second remote camera 106b at the second remote facility 101b may in this embodiment be transmitted for playing via a display screen associated with the third box seat 152c. Therefore, participants in the live event may also see visual reactions of remote consumers in addition to hearing audible reactions of the remote consumers. If a remote consumer pumps the arms and/or stands in excitement along with making a loud cheer, the live event participants may glance up and see the actions (upwards arm pumping, standing crowd) displayed as a video depiction on a venue display screen, e.g., with a venue display screen associated with a particular venue seat, along with hearing the cheers of this remote consumer which have been piped from the remote location for playing at speakers of the venue. In other embodiments a video recording captured of remote consumers may be played on a venue big-screen display alone or in conjunction with one or more other video feeds captured from remote locations.

Although FIG. 1C shows the box 150 divided into four sections with multiple seats in each of those sections and one microphone/speaker per section, in alternative embodiments a respective microphone/speaker will be provided for each seat of the venue. Thus, remote cheering may be piped in on an individual basis instead of on a venue section basis.

Figure 2A:
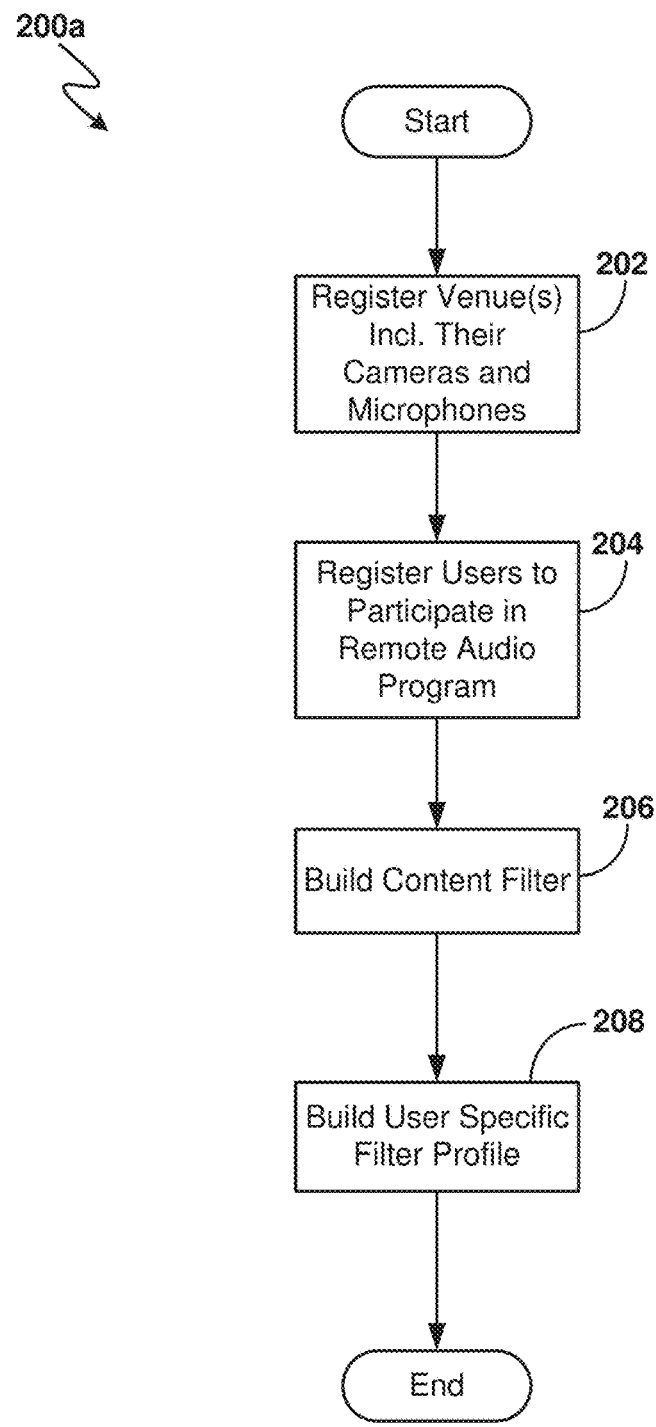
FIG. 2A is an operational flowchart illustrating a remote consumer content interaction preparation process according to at least one embodiment.

Referring now to FIG. 2A, an operational flowchart depicts a remote consumer content interaction preparation process 200a according to at least one embodiment. This remote consumer content interaction preparation process 200a may be implemented using one or more portions of the remote consumer interaction content management program 110a, 110b1, 110b2, 110b3, 110c shown in FIG. 1A. The remote consumer interaction content management program 110a, 110b1, 110b2, 110b3, 110c may include various modules, user interfaces, services, machine learning models, and natural language processing tools and may use data storage when remote consumer content interaction preparation process 200a is performed. The remote consumer content interaction preparation process 200a helps prepare the software, process participants, and technical components to perform the remotely-generated content transmission to a live event and the feedback loops described above with respect to FIGS. 1A-1D.

In a step 202 of the remote consumer content interaction preparation process 200a, a venue is registered with the program 110a. This registration of the venue may include the registration of all of the cameras, microphones, and speakers that are at the venue. The registration may include a venue representative downloading a software application (an app) onto a venue computer 102d. The venue representative may actuate various graphical user interface buttons that are displayed on a display screen of the respective computer when the downloaded app is stored and executed. The display may include one or more scrollable lists or swipable graphics that are displayed on the display monitor of the venue computer 102d. The downloaded application may also be synched up with the venue sound system including the various microphones and/or speakers of the venue.

In some embodiments, the venue is allowed to provide samples of recordings of noise and/or sounds which the venue finds suitable for propagation and playing at the venue. These recordings may be used to train a machine learning model to which the remote sounds may be transmitted during the sound vetting for the live event broadcast. These suitable sounds may include shouts, cheers, hurrahs, jeers, chants, names, anthems, theme songs, etc. A unique machine learning model may be applied specific for each registered venue.

In some embodiments, the venue is allowed to provide samples of recordings of noise and/or sounds which the venue finds unsuitable for propagation and playing at the venue. These unsuitable recordings may be used to train a machine learning model that may be used to vet sound for playing at the live event broadcast. Unsuitable recordings may include audio clippings and sounds which the venue prefers not to be publicly played such as background chatter, background conversation, background gossiping, cuss/ swear words, racial taunts, background noise, noises with unsafely high decibel levels, etc.

In some embodiments, the venue is allowed to provide word input of words which the venue finds suitable for propagation and of other words which the venue finds unsuitable for propagation to the venue. These words may be stored by the program 110b1 in a text form so that the program 110b1, 110b2, 110b3, 110a, 110c may perform filtering of a text block that is generated from speech-to-text transcription of live event remote consumer audio response. During this registration portion, the venue may provide this word input in a typed form and/or in a spoken form. If received in this registration phase in a spoken form, the program 110c, 110a may perform speech-to-text transcription to create entries for a filtering dictionary to be used during recording vetting that is part of the program 110b1, 110b2, 110b3, 110a, 110c. Such vetting may be performed during the live event when the remote consumer recording is received and analyzed for suitability for propagation to the venue.

The venue registration that is received may be stored in memory that is part of the remote consumer interaction content management program 110a, 110c or that is accessible to the remote consumer interaction content management program 110a, 110c. For example, a venue profile with a venue machine learning model filter may be saved in the database 114 shown in FIG. 1, in the storage 524 and/or persistent storage 513 of the client computer 101 shown in FIG. 3, in memory of a server such as the remote server 504 within and connected to the first or second communication network 116a, 116b, in memory of an edge/gateway server or of a network edge server, and/or in other memory in one or more other remote servers that are accessible to the remote consumer interaction content management program 110a, 110c via the first or second communication network 116a, 116b via a wired or wireless connection.

The venue registration of step 202 in some embodiments includes the input of speakers, speaker positions at the venue, venue sections, physical seats of the venue, virtual seats, microphones, microphone positions at the venue, cameras, camera positions at the venue, and/or fan seating plans. Using these input variables, the program 110a, 110c may generate a selection array for remote consumers to choose to decide which playing and consuming experience the remote consumer wishes to experience for a live event. The fan seating plan may include grouping fans of one team/player together in different sections of the venue. The selection array may subsequently allow a user to choose from where in the stadium their remotely-generated content will be played, and from where in the stadium the user receives recordings (sound and/or video) for the broadcast experience.

In a step 204 of the remote consumer content interaction preparation process 200a, users are registered to participate in the remote consumer interaction content management program 110a. For example, individual people such as those people shown at the first remote facility 101a, the phone user Y, and/or those people such as remote consumers A and B shown at the second remote facility 101b may register with the program 110a for participation. The registration may include the user downloading a software application (an app) onto a phone and/or a computer such as the first remote consumer computer 102a, the remote smart phone 102b, and the second remote consumer computer 102c. The users may actuate various graphical user interface buttons that are displayed on a display screen of the respective computer when the downloaded app is stored and executed. The user may peruse and select from a selection array for remote consumers that was created using venue information as was described above with respect to step 202. The selection array allows a user to choose from where in the stadium their remotely-generated content will be played, and from where in the stadium the user receives recordings (sound and/or video) for the broadcast experience. The registration display for the user may include one or more scrollable lists or swipable graphics that are displayed on the display monitor of a respective remote consumer computer. The downloaded application may also be synched up with artificial intelligence assistants which have speakers and cameras and which may record audio reactions and/or video reactions of the parties watching a live event at a remote location and transmit these recordings to the server 112 for eventual transmission to the first venue 124.

The user may select various recording options such as recording all group voices at the particular remote location, recording one or more specified individual voices such as the voice of this registrant, wanting venue sound output from a general venue microphone or from a virtual seat/section designated venue microphone, and/or wanting remote consumer recordings to be sent to a general venue speaker for playing in an aggregated form with other remote participants recordings or to be sent to a specified venue speaker associated with a particular venue seat/section for playing in an individualized manner.

In some embodiments, the user is shown a display of various predefined locations such as physical seats of the venue and the user is given an opportunity to register for/reserve one of these predefined locations, e.g., seats, as a sound conduit to the venue for the user, with the remote noise from this user being played at a speaker at or near this selected physical seat and for stadium noise being captured from a microphone that is at or near this seat. This capturing of stadium noise may be sent back to the remote facility for playing to accompany a video stream of the live event. This registration may also include an option for a selection of a physical seat for playing the remote audio but the user still receiving audio from the venue that is capture from a general stadium microphone.

In some embodiments, the user is allowed to provide samples of recordings of the voice of the user so that the program 110*a*, 110*b*1, 110*c* can recognize this recording and match it with the registered account/physical seat. The individual voice recordings may be stored in a user profile in a database such as the database 114 in the RCICM server 112 or in a local database on the computer of this user such as the first remote consumer computer 102*a* for a first user at the first remote facility 101*a*. In some embodiments, the user also registers voice samples of other people such as friends and/or family with whom the user plans to consume a broadcast of a live event or with whom the user regularly consumes the live event broadcast. The program 110*a*, 110*b*1, 110*c* may use these sample recordings for security features and/or filtering purposes at the time of propagation of the remote responses being transmit for playing at the live venue.

In some embodiments, the user is allowed to provide samples of recordings of noise and/or sounds which the user finds suitable for propagation and playing at the venue. These recordings may be used to train a machine learning model to which the remote sounds may be transmitted during the sound vetting for the live event broadcast. These suitable sounds may include shouts, cheers, hurrahs, jeers, chants, names, anthems, theme songs, etc. A unique machine learning model may be applied specific for each registered user.

In some embodiments, the user is allowed to provide samples of recordings of noise and/or sounds which the user finds unsuitable for propagation and playing at the venue. These unsuitable recordings may be used to train the same or a different machine learning model mentioned above that may be used to vet sound for playing at the live event broadcast. Unsuitable recordings may include audio clippings and sounds which the user prefers not to be publicly played such as background chatter, background conversation, cuss/swear words, racial taunts, background noise, etc.

In some embodiments, the user is allowed to provide word input of words which the user finds suitable for propagation and of other words which the user finds unsuitable for propagation to the venue. These words may be stored by the program 110*b*1 in a text form so that the program 110*b*1, 110*a* may perform filtering of a text block that is generated from speech-to-text transcription of live event remote consumer audio response. During this registration portion, the user may provide this word input in a typed form and/or in a spoken form. If received in this registration phase in a spoken form, the program 110*b*1, 110*a* may perform speech-to-text transcription to create entries for a filtering dictionary to be used during recording vetting that is part of the program 110*b*1, 110*a*. Such vetting may be performed during the live event when the remote consumer recording is received and analyzed for suitability for propagation to the venue.

The user profile and user registration that are received may be stored in memory that is part of the remote consumer content interaction propagation program 110*a*, 110*b*1, 110*b*2, 110*b*3, 110*c* or that is accessible to the remote consumer content interaction propagation program 110*a*, 110*b*1, 110*b*2, 110*b*3, 110*c*. For example, a user profile with a user machine learning model filter may be saved in the database 114 shown in FIG. 1, in the storage 524 and/or persistent storage 513 of the client computer 101 shown in FIG. 3, in memory of a server such as the remote server 504 within and connected to the first or second communication network 116*a*, 116*b*, and/or in other memory in one or more other remote servers that is accessible to the remote consumer content interaction propagation program 110*a*, 110*b*1, 110*b*2, 110*b*3, 110*c* via the first or second communication network 116*a*, 116*b* via a wired or wireless connection.

In a step 206 of the remote consumer content interaction preparation process 200*a*, a content filter for the remote consumer interaction content management program 110*a*, 110*b*1, 110*b*2, 110*b*3, 110*c* is built. This content filter may be built using the filter and suitability input received from both the venue and the user during the registrations of steps 202 and 204, respectively. This building of the content filter may include training one or more machine learning models with the input information. The content filter may include multiple content filters, for example, one user-based content filter and another venue-based content filter. Such multiple content filters may include or may include accessing multiple machine learning models, for example, one user-based machine learning model and another venue-based machine learning model. A representative of an organization running the remote consumer content interaction propagation program 110*a*, 110*b*1, 110*b*2, 110*b*3, 110*c* may also provide input such as voice recording samples and textual input for the content filter of suitable and non-suitable word/recordings to allow for transmission. Web-based scraping may also occur for step 206 and may use artificial intelligence and natural language processing to find reported instances of acceptable terms/noise or non-acceptable terms/noise to be played at a venue. Such web-based scraping may allow the content filter to become up-to-date on new slang terms that may enter modern lingo/vocabulary and would be unsuitable for playing on a broadcast. The web-based scraping may generate lists of newly found words/phrases which can be presented to the user, the venue representative, and/or the propagation program representative for confirmation that such words should be filtered out and not propagated for playing at the venue. Such list may be presented via a data transmission that results in a graphical user interface being displayed at a computer accessible to the receiver. The receiver provides confirmation feedback by actuating the graphical user interface using the respective local computer, e.g., the first remote consumer computer 102a, the server 112, the venue computer 102d, etc.

In a step 208 of the remote consumer content interaction preparation process 200a, a user specific filter profile is built for the various registered individual users of the program 110a, 110b1, 110b2, 110b3. This user-specific content filter may be built using the filter and suitability input received from both the user during the registrations of step 204. Step 208 may include storing voice samples of the registered user and/or of other persons with whom this registered user expects to consume live events together at a single remote facility at which audio and physical movement reactions at the remote facility can be captured/recorded for playing at the venue. The content filters created in steps 206 and/or 208 may be stored in the database 114 of the server 112, in memory storage of the local remote consumer computer, in memory storage of the venue, and/or in other memory storage accessible to these computers.

Machine learning models may be implemented for the content filters. Such machine learning models may include naive Bayes models, random decision tree models, linear statistical query models, logistic regression n models, neural network models, e.g. convolutional neural networks, multi-layer perceptrons, residual networks, long short-term memory architectures, algorithms, deep learning models, deep learning generative models, and other models. Training data includes the samples and text information of suitable and non-suitable words/sounds. The learning algorithm finds patterns in input data in order to map the input data attributes to the target. The machine learning models contain these patterns so that the filtering answer can be predicted for similar future inputs. A machine learning model may be used to obtain predictions on new input recordings. The machine learning model uses the patterns that are identified to determine what the appropriate filtering decision is for future recordings received and analyzed. As samples are being provided, training of the one or more machine learning models may include supervised learning by submitting prior digital recordings to an untrained or previously-trained machine learning model. In some instances, unsupervised learning for the one or more machine learning models may also be implemented.

Figure 2B:
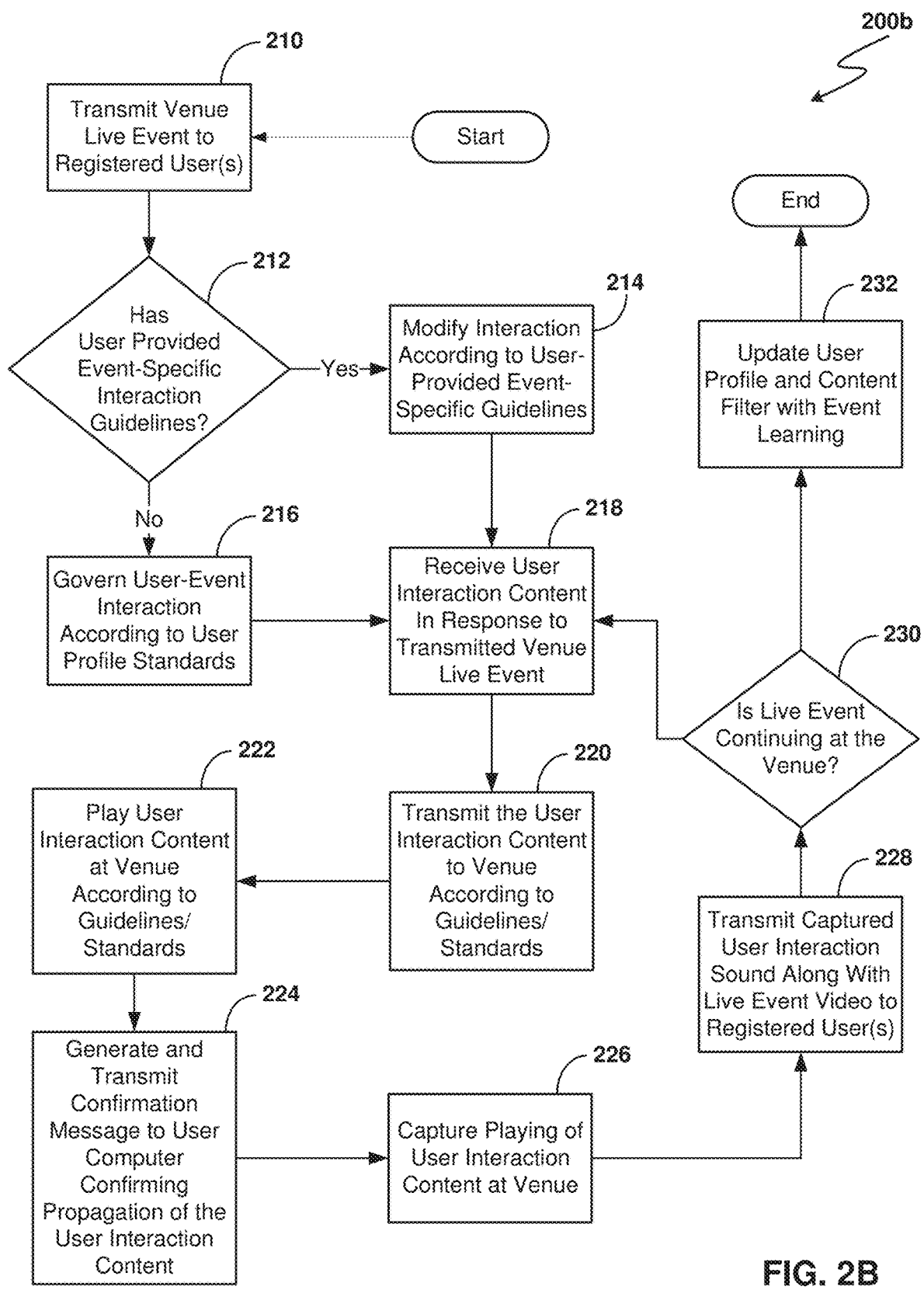
FIG. 2B is an operational flowchart illustrating a remote consumer content interaction propagation process according to at least one embodiment.

FIG. 2B is an operational flowchart illustrating a remote consumer content interaction propagation process 200b according to at least one embodiment. This remote consumer content interaction propagation process 200b may be implemented using one or more portions of the remote consumer interaction content management program 110a, 110b1, 110b2, 110b3, 110c shown in FIG. 1A. The remote consumer interaction content management program 110a, 110b1, 110b2, 110b3, 110c may include various modules, user interfaces, services, machine learning models, and natural language processing tools and may use data storage when remote consumer content interaction propagation process 200b is performed. The remote consumer content interaction propagation process 200b performs the remotely-generated content transmission to a live event and the feedback loops described above with respect to FIGS. 1A-1D. The remote consumer content interaction propagation process 200b relies on the software, process participants, and technical components being prepared due to performance of the remote consumer content interaction preparation process 200a to prepare the software, participants, and technical components.

In a step 210 of the remote consumer content interaction propagation process 200b, a venue transmits a live event to registered users. One or more registered users turns on a receiving device such as a television and/or a radio to watch and/or listen to a broadcast of this live event that is being transmitted as part of step 210. A computer such as the first remote consumer computer 102a may receive and play this broadcast of the live event or have a wired or wireless connection with another television and/or radio of the respective facility, e.g., the first remote facility 101a. The reception and playing of a live event from a venue that is participating in the remote consumer interaction content management program 110a, 110b1, 110b2, 110b3, 110c may send a notification signal to the remote consumer interaction content management program 110b1 on the first remote consumer computer 102a at the first remote facility 101a. The consumer content interaction propagation process 200b may leverage the main broadcast of a live event in order to perform one of the feedback loops described herein.

The running of the program 110b1 on the first remote consumer computer 102a in some embodiments occurs with a user actuation of a graphical user interface button on the first remote consumer computer 102a to trigger the app, the program 110b1. This actuation may occur via the user pressing one or more keys on the keyboard or on a touch screen keyboard, via performing one or more mouse clicks when the mouse cursor is positioned over the graphical user interface app icon, via a user speaking an actuation command into a microphone connected to the first remote consumer computer 102a, and/or via other methods.

In other embodiments, the program 110b1 may automatically begin audio recording with a microphone and/or physical movement capture with a camera based on the program 110b1 and the first remote consumer computer 102a receiving a notification signal from a smart television, from itself, and/or from another computer. Such notification signal may be automatically generated when the smart television, the first remote consumer computer 102a, and/or another computer broadcasting a live event.

In a step 212 of the remote consumer content interaction propagation process 200b, a determination is made whether a specific remote consumer has provided event-specific interaction guidelines for the live event. Upon initiation of the program 110b1 on the first remote consumer computer 102a in conjunction with broadcast of a live event, a graphical user interface will be generated for display on the first remote consumer computer 102a to ask if the remote user registered for the account prefers to proceed with previously-provided propagation features (such as for individualized voice recording playing or for voice recording aggregation with other users) or would like to provide customized propagation information for this particular broadcast. The user may engage with the graphical user interface using one or more input devices of the first remote consumer computer 102a to accept standard propagation configurations or to customize for this particular broadcast.

In some embodiments, a machine learning model of the program 110b1 may evaluate characteristics of the broadcast and present propagation configuration options to the remote consumer that match the broadcast and/or previous propagation configurations selected by this remote consumer for similar broadcasts. For example, if a user often watches games/matches of a particular team and chooses a recording aggregation option for aggregating the recordings with recordings of other fans of this team then the program 110b1 may present this selection configuration as a proposal to the user. This proposal may be provided even if the user has not designated this selection configuration in the user profile.

If the determination of step 212 is negative and the user has not provided event-specific interaction guidelines, then the process 200b proceeds to step 216. If the determination of step 212 is affirmative and the user has provided event-specific interaction guidelines, then the process 200b proceeds to step 214.

In a step 214 of the remote consumer content interaction propagation process 200b, the interaction is modified according to the user-provided event-specific guidelines. These guidelines may include aspects of audio and/or video capture at the respective remote area, e.g., the first remote facility 101a, at which the live broadcast is being consumed.

In a step 216 of the remote consumer content interaction propagation process 200b, the user-event interaction is governed according to user profile standards. These user profile standards may include aspects of audio and/or video capture at the respective remote area, e.g., the first remote facility 101a, at which the live broadcast is being consumed.

In a step 218 of the remote consumer content interaction propagation process 200b, user interaction content is received in response to the transmitted venue live event. For example, the remote consumer interaction content management program 110b1 may cause the first microphone 105a and/or the first camera 106a to capture sound response and/or physical movement response of the users watching at the first remote facility 101a the venue live event that is taking place remotely at the first venue 124. Whether triggered manually via a remote consumer or automatically, for step 218 the program 110b1 may continuously and/or intermittently capture voice sounds and/or user physical actions that occur at the respective remote location during the live event and the live event broadcast.

In a step 220 of the remote consumer content interaction propagation process 200b, the user interaction content is transmitted to the venue according to the guidelines/standards. For example, this transmission may include the remote consumer interaction content management program 110b1 transmitting the recording to the remote consumer interaction content management server 112 and the remote consumer interaction content management server 112 transmitting the recording to the remote consumer interaction content management program 110c at the venue computer 102d. One or more communication networks such as the first and second communication networks 116a, 116b shown in FIG. 1A may be used for the transmission of step 220.

The transmission of the remote consumer recordings occurs according to the guidelines/standards such as not exceeding a decibel safety level to ensure that sound played at the venue is within an acceptable health and safety range. Sound captured from the remote facilities that exceeds the decibel level may be reduced to the upper limit of the acceptable decibel safety level. Other guidelines/standards include sanitizing the input audio recording so that words that violate a suitability standard are removed from the transmitted recording. This sanitizing helps ensure that no expletive or vulgarity is transmitted for playing to the live event participants and subsequently to the mass audience watching at various remote locations.

These guidelines/standards invoked in step 220 may also include an indication of whether the received recording from a particular account/location is played out individually at the venue at a speaker/screen reserved for this account/remote location or is played out from a general venue speaker/screen in an aggregated form combined with other recordings that were received from other accounts/remote locations. The aggregated form may constitute a collective voice of multiple remote consumers watching and cheering at various remote locations. The aggregation may be performed by an audio mixer that is part of the program 110a at the server 112. The server 112 may generate one or more aggregated recordings and send these to the venue and specifically to the venue computer 102d in one or more channels running between the server 112 and the first venue 124. If an individual remote consumer recording is designated for being played at a particular location within the venue, the recording may be transmitted through the second communication network 116b with a speaker indicator that may be read and understood by the program 110c at the venue computer 102d. Based on the speaker indicator, the program 110c may transmit this particular recording to a speaker that matches the speaker indicator. If an aggregated consumer recording is designated for being played at a particular location within the venue, the aggregated consumer recording may be transmitted through the second communication network 116b with a speaker indicator that may be read and understood by the program 110c at the venue computer 102d. Based on the speaker indicator, the program 110c may transmit this particular aggregated recording to a speaker that matches the speaker indicator. If the venue computer 102 receives a recording without any speaker indicator, the program 110c may interpret this lack of indicator as being acceptable for any speaker of the venue and/or for a general speaker of the venue. If a venue sound playing plan has no remote consumer matched to a particular venue speaker, in some embodiments a received recording without any speaker designation may be routed to that particular venue speaker.

These guidelines/standards invoked in step 220 may also include vetting the received remote consumer recordings via a stored filtering dictionary, via a user-generated machine learning model filter, and/or via a venue-generated machine learning model filter to determine suitable recording portions for propagation and to determine unsuitable recording portions to block from propagation. The machine learning models were described above in the venue registration step 202 of the process 200a and in the user registration of step 204 of the remote consumer content interaction preparation process 200a. Thus, step 220 may include identifying, distinguishing, and judging the incoming sounds to ensure these sounds belong to an approved set of classified sounds. This filtering may help nullify and/or minimize background noise, ongoing conversations, etc. that are generated at the remote locations and picked up by the remote microphone capture for the program 110b1. The filtering is intended to allow claps, cheers, and acceptable jeers for propagation. This filtering negates chats/conversations and contributes to a clean set of recordings for propagation to the venue and playing at the venue.

In some embodiments, the recording from the remote consumer is submitted to multiple machine learning models sequentially or in parallel. For the sequential embodiment, the recording is submitted to the second machine learning model, e.g., to the venue-based machine learning model, in response to the output of the first machine learning model indicating suitability for propagation. In response to the first machine learning model, e.g., the user-based machine learning model, indicating unsuitability for propagation and playing at the venue, no inputting into the second machine learning model is performed. In the parallel embodiment, the recording is inputted into the first machine learning model and into the second machine learning model simultaneously or without waiting for a conclusion from the first machine learning model before inputting into the second machine learning model.

The cleansing and filtering in step 220 may be carried out based on venue registration and user profile settings and may be carried out in parallel to ensure that suitable recordings are propagated to the venue for being played at the venue and to ensure that unsuitable recording portions are blocked from being transmitted to the venue. This filtering of step 220 helps keep a check on transmitted recordings so as to validate content being propagated for playing at the venue.

The invoking of the guidelines/standards in step 220 may include curating and applying details from the user profiles saved for a registered user. This invoking may include allowing one or more voice samples for propagation if the one or more voice samples match stored registered voice samples for this account.

In some embodiments, the program 110*a* may from the received recording from a particular remote facility/location parse out separate voices that match different stored voices in the account profile. In some instances, these parsed out separate voices may be sent as separate streams to different audio speakers of the venue. For example, the parsing may be based on user selections to have their voice broadcast from a particular section/speaker of the venue which may be different than that selected by another registered voice that is captured at the same remote facility. The parsing and separating of multiple voices may implement speaker diarization techniques such as front-end processing, voice enhancement and denoising, dereverberation, voice separation, voice activity detection, segmentation, speaker representations and similarity measurements, metric based similarity measurements, neural network based speaker representations, joint factor analysis of i-vector and probabilistic linear discriminant analysis, clustering such as agglomerative hierarchical clustering and spectral clustering, k-means clustering, joint optimization of segmentation and clustering, deep learning with single-module optimization, joint segmentation with embedding, extraction and resegmentation, fully end-to-end neural diarization, etc. Step 220 may include leveraging voice recognition so that the voice(s) of registered users are propagated to the venue for playing there and any other recognized voices are filtered out and blocked from propagation to the venue.

In a step 222 of the remote consumer content interaction propagation process 200*b*, the user interaction content is played at the venue according to the guidelines/standards. The program 110*c* at the venue computer 102 may play an aggregated stream from a venue central speaker and/or venue central display screen and/or may send individualized streams or multiple aggregated streams to separate audio speakers/separate display screens throughout the venue. The program 110*c* may have control or supplemental control of the sound system and display screens of the venue and may send recording signals to the various venue audio speakers and/or venue display screens for playing of the remotely-generated spectator recordings. Due to the playing of step 222, the live event participants are able to hear the played audio as if the fans at the remote locations were physically at the first venue 124. In some instance the live event participants are able to see, on display screens at the venue, physical reactions such as a standing audience, fist-pumping, etc. that shows the excitement of the remote spectators.

In a step 224 of the remote consumer content interaction propagation process 200*b*, a confirmation message is generated and transmitted to the user computer to confirm the propagation of the user interaction content. Based on filtering that occurred as a part of step 220, the confirmation message may include statistics and feedback to the remote consumers so that the remote consumers can know which recording portions were sent to the venue for playing there, which recording portions were blocked, and the reasoning for these determinations. This feedback helps the remote consumers better generate responses in the future that will have a higher chance for propagation to the venue for playing there. Thus, this feedback of the confirmation message may be part of a reinforced learning module of the program 110*a*, 110*b*1, 110*b*2, 110*b*3, 110*c*. FIG. 1D shows an example of a first confirmation message 160 that may be generated and transmitted as part of step 224. The remote user may receive the confirmation message at their computer and play the confirmation message to understand how the filter applied filtering decisions to the recordings of this remote user.

In a step 226 of the remote consumer content interaction propagation process 200*b*, playing of user interaction content at the venue is captured. This capturing may occur via cameras and/or microphones that are being used to perform an initial broadcast of the live event. Thus, these captured sounds and/or displays may be transmitted back to the various remote locations such as the first remote facility 101*a*, the remote smart phone 102*b*, and the second remote facility 101*b* for playing at the computers of these various remote locations. Thus, the remote consumers will be able to hear and/or see themselves and/or a collective remote fan voice when they continue to watch the live event broadcast. With step 226, the process 200*b* leverages existing technical components used to carry out the main broadcast to be involved in the content feedback loops that are part of the present disclosure. In some instances, the venue may provide separate audio streams for this broadcast stream with respective audio streams originating/being captured from specified locations (microphones) in the stadium for a customized broadcast experience, e.g., for an experience customized to a particular selected physical seat/section of the venue that a remote consumer selected.

In a step 228 of the remote consumer content interaction propagation process 200*b*, captured user interaction sound along with live event video is transmitted to the registered user(s). This transmission may occur through the traditional broadcast structure such as cable television, over-the-air television/radio signal, internet signal, etc.

In a step 230 of the remote consumer content interaction propagation process 200*b*, a determination is made whether the live event is continuing at the venue. The program 110*a* at the server 112 may determine whether a broadcast stream feed from the venue continues in order to perform the determination of step 230. If the determination of step 230 is affirmative and the live event continues, the process 200*b* proceeds to step 218 for a repeat of steps 218, 220, 222, 224, 226, and/or 228 for the process 200*b*. In this manner, remotely-generated recordings from remotely-situated fans may be played continuously and/or intermittently at the venue throughout the live event, in near-real time with only transmission lags and filtering lag times creating a small delay from a remote audience live response. If the determination of step 230 is affirmative and the live event has ended, the process 200*b* may proceed to step 232.

In a step 232 of the remote consumer content interaction propagation process 200*b*, the user profile and content filter are updated with event learning. This updating may be based on the specific live event just completed in this particular iteration of the process 200b. For example, if the user provided new propagation configurations these new configurations may be saved in the user profile and/or in a machine learning model associated with the user profile. The content filter may also receive feedback from the remote consumers, the venue representative, and/or the program representative about filtering decisions that were made during the live broadcast and adjust the content filters based on approval and/or non-approval of these filtering decisions. The content filters may also be updated at this point with new information obtained from program web crawling about new terms that should be blocked from propagation and playing at the venue.

After step 232 the remote consumer content interaction propagation process 200b is ended. The remote consumer content interaction propagation process 200b may begin again when a new live event from a registered venue is began and transmitted to remote consumers. The user profile and content filter updates that were updated in step 232 may be used during subsequent iterations of emote consumer interaction content propagation process 200b. For example, in these subsequent performances of the emote consumer interaction content propagation process 200b, step 220 may include implementing updated filters to vet and parse out suitable portions of the recording for propagation to the venue.

In some embodiments, a user may actuate the program 110b1 to register for an upcoming live event broadcast and provide propagation configurations for the upcoming live event. In this instance, the program 110b1 may save time at a beginning of a broadcast without requiring confirmation or bypass from the remote consumer. The program 110b1 may also provide settings displayed on the screen that allow the registered remote consumer(s) to adjust the propagation configurations during a broadcast. A user may dynamically change propagation preferences by choosing to enter or accept a particular propagation configuration. After the propagation has begun, the user may again change the configuration by actuating GUI buttons displayed on a tab for the remote consumer content interaction propagation program 110a displayed at the respective remote user computer such as the first remote consumer computer 102a.

In some embodiments at the beginning of a live broadcast, the remote consumer content interaction management program 110b1 may generate a bypass graphical user interface (GUI) which asks whether the remote consumer for this particular broadcast would like to skip or bypass capturing of the audio/video at the remote location for propagating to the live venue. If the bypass GUI is accepted/confirmed, the program 110b1 may rest so that the live broadcast is played without producing a recording of the remote fans responses at the remote location.

The principles for using audio samples for machine learning models and content filters for the remote consumers and/or venues may also be applied with provided video samples of physical reactions of the remote consumers. For example, video samples of remote consumers standing, gesturing, etc. may be provided as examples of content that is suitable for propagation, while other video samples may be provided as examples of content that is not suitable for propagation. Video samples may also be provided to match registered accounts with individuals and registered friends with non-registered individuals on the video, so that video may be displayed at the venue of registered users. Video recordings with multiple persons may use cropping techniques to separate a single video recording into multiple separate recordings (one recording per person).

It may be appreciated that FIGS. 2A and 2B provide illustrations of some embodiments and do not imply any limitations with regard to how different embodiments may be implemented. Many modifications to the depicted embodiment(s), e.g., to a depicted sequence of steps, may be made based on design and implementation requirements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a tem' used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that, term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code involved in performing the inventive methods, such as remote consumer interaction content management 316. In addition to remote consumer interaction content management 316, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and remote consumer interaction content management program 316, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

COMPUTER 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 1. On the other hand, computer 301 is not required to be in a cloud except to any extent as may be affirmatively indicated.

PROCESSOR SET 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in remote consumer interaction content management program 316 in persistent storage 313.

COMMUNICATION FABRIC 311 is the signal conduction path that allows the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 312 is any type of volatile memory now known or to be developed in the future. Examples include dynamic type random access memory (RAM) or static type RAM. Typically, volatile memory 312 is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

PERSISTENT STORAGE 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface-type operating systems that employ a kernel. The code included in remote consumer interaction content management program 316 typically includes at least some of the computer code involved in performing the inventive methods.

PERIPHERAL DEVICE SET 314 includes the set of peripheral devices of computer 301. Data communication connections between the peripheral devices and the other components of computer 301 may be implemented in various ways, such as Bluetooth connections, Near-Field Communication (NEC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

NETWORK MODULE 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN 302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

REMOTE SERVER 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

PUBLIC CLOUD 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set. 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is hound together by standardized or proprietary technology that enables orchestration, management, and/or data/application portability between the multiple constituent clouds. In this embodiment, public cloud 305 and private cloud 306 are both part of a larger hybrid cloud.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for propagating a recording, the method comprising:
   receiving, via a first computer, respective recordings from user computers disposed remote from a venue;
   analyzing, via the first computer, the received recordings;
   receiving, via the first computer, respective selections from the user computers, the respective selections being for a subset of speakers from multiple speakers at the venue and the respective selections selecting the subset based on a respective location of the subset within a respective section of the venue;
   in response to determining based upon the analyzing of the received recordings that at least respective portions of the recordings are suitable for propagation, transmitting, via the first computer, the respective portions of the recordings to the venue for playing of the respective portions at the subset of speakers and not at remaining speakers of the multiple speakers at the venue;
   in response to the transmitting of the respective portions of the recordings, transmitting, via the first computer and to the user computers, a respective confirmation message; and
   transmitting, via the first computer and to the user computers, audio captured from microphones disposed in the respective section for playing at the user computers.

2. The method of claim 1, wherein the analyzing comprises performing speech-to-text transcription of content of the recordings to produce a text block and analyzing the text block.

3. The method of claim 1, wherein at least one of the recordings is a digital recording and the analyzing comprises inputting the digital recording into a trained machine learning model and, in response, receiving an output from the trained machine learning model; and
   wherein the determining of the recordings being suitable for propagation is based on the output of the trained machine learning model.

4. The method of claim 3, further comprising training a first machine learning model to form the trained machine learning model, wherein the training of the first machine learning model comprises submitting prior digital recordings to the first machine learning model.

5. The method of claim 1, wherein the transmitted portion of the recordings is a first portion and a second portion of the recordings was not transmitted to the venue; and
   wherein the confirmation message comprises feedback indicating a first explanation for transmission of the first portion and a second explanation for non-transmission of the second portion.

6. The method of claim 1, wherein the transmitted portion of the recordings is a first portion and a second portion of the recordings was not transmitted to the venue; and
   wherein the confirmation message comprises feedback indicating a first amount percentage of the first portion compared to a total content of the received recordings and a second amount percentage of the second portion compared to the total content of the received recordings.

7. The method of claim 1, further comprising:
   receiving, via the first computer, a second selection for audio aggregation from the user computers; and
   in response to receiving the second selection, aggregating, via the first computer, the portion of the recording with additional received recordings to form an aggregated recording;
   wherein the transmitting, via the first computer, of the portion of the recordings to the venue occurs via transmitting the aggregated recording to the venue for playing of the aggregated recording.

8. The method of claim 1, wherein the analyzing of the received recordings comprises comparing the received recordings to stored audio samples associated with the user computers.

9. The method of claim 8, wherein the stored audio samples comprise voice recordings of multiple voices.

10. The method of claim 8, wherein the analyzing of the received recording comprises comparing the received recording to a stored dictionary comprising acceptable sounds and unacceptable sounds; and
    wherein the determining that the recording is suitable for propagation is based on the portion of the received recording matching the acceptable sounds.

11. A computer-implemented method comprising:
    receiving, via a first computer, a recording from a user computer;
    analyzing, via the first computer, the received recording;
    in response to determining based upon the analyzing of the received recording that at least a portion of the recording is suitable for propagation, transmitting, via the first computer, the portion of the recording to a venue for playing of the portion, wherein the transmitted portion of the recording is a first portion and a second portion of the recording was not transmitted to the venue; and
    in response to the transmitting of the portion of the recording, transmitting, via the first computer and to the user computer, a confirmation message, wherein the confirmation message comprises:
       feedback indicating a first explanation for transmission of the first portion and a second explanation for non-transmission of the second portion, and
       additional feedback indicating a first amount percentage of the first portion compared to a total content of the received recording and a second amount percentage of the second portion compared to the total content of the received recording.

12. The method of claim 11, wherein the recording is generated at the user computer in response to the user computer receiving a transmitted broadcast of a video recording from the venue.

13. The method of claim 12, wherein the transmitted broadcast further comprises a venue audio recording.

14. The method of claim 13, further comprising:
    receiving, via the first computer, a selection from the user computer, the selection comprising a first microphone from multiple microphones at the venue, wherein the venue audio recording is captured at the selected first microphone.

15. The method of claim 14, wherein the portion of the recording is transmitted to the venue with an indicator designating a first speaker at the venue for audible playing of the transmitted portion at the first speaker, wherein the first speaker is associated with the selected first microphone by being positioned in a same first section of the venue.

16. The method of claim 11, wherein unsuitability for propagation is based on at least one member selected from group consisting of irrelevance to an event at the venue, a curse word, vulgarity, a violent word, hate speech, and sound quality.

17. A computer-implemented method comprising:
    receiving, via a first computer, a recording from a user computer;
    analyzing, via the first computer, the received recording by comparing the received recording to stored audio samples associated with the user computer;
    in response to determining based upon the analyzing of the received recording that at least a portion of the recording is suitable for propagation, transmitting, via the first computer, the portion of the recording to a venue for playing of the portion; and
    in response to the transmitting of the portion of the recording, transmitting, via the first computer and to the user computer, a confirmation message.

18. The method of claim 17, wherein the stored audio samples comprise a voice recording of a first voice.

19. The method of claim 18, wherein the determining that the recording is suitable for propagation is based on the received recording including a recording of a consumer voice which matches the first voice.

20. The method of claim 17, wherein unsuitability for propagation is based on at least one member selected from group consisting of irrelevance to an event at the venue, a curse word, vulgarity, a violent word, hate speech, and sound quality.

* * * * *